(12) United States Patent
Dahl et al.

(10) Patent No.: US 8,603,941 B2
(45) Date of Patent: Dec. 10, 2013

(54) METHOD AND APPARATUS FOR THE PURIFICATION OF EXHAUST GAS FROM A COMPRESSION IGNITION ENGINE

(75) Inventors: Søren Dahl, Hillerød (DK); Keld Johansen, Frederikssund (DK); Søren Pehrson, Vanløse (DK); Gurli Mogensen, Lynge (DK)

(73) Assignee: Haldor Topsoe A/S, Lyngby (DK)

( * ) Notice: Subject to any disclaimer, the term of this patent is extended or adjusted under 35 U.S.C. 154(b) by 24 days.

(21) Appl. No.: 11/907,381

(22) Filed: Oct. 11, 2007

(65) Prior Publication Data
US 2008/0152565 A1   Jun. 26, 2008

(30) Foreign Application Priority Data
Oct. 23, 2006   (DK) ................................. 2006 01364

(51) Int. Cl.
  *B01J 23/44*   (2006.01)
  *B01J 21/00*   (2006.01)
  *B01J 23/10*   (2006.01)
  *B01D 47/00*   (2006.01)
  *B01D 53/86*   (2006.01)

(52) U.S. Cl.
  USPC ........... 502/333; 502/262; 502/304; 423/210; 423/235

(58) Field of Classification Search
  None
  See application file for complete search history.

(56) References Cited

U.S. PATENT DOCUMENTS

| | | | |
|---|---|---|---|
| 4,902,487 A | | 2/1990 | Cooper et al. |
| 6,245,307 B1 | * | 6/2001 | Inui et al. ................... 423/213.5 |
| 6,921,738 B2 | * | 7/2005 | Hwang et al. ................. 502/240 |
| 7,062,904 B1 | * | 6/2006 | Hu et al. .......................... 60/286 |
| 2003/0124037 A1 | * | 7/2003 | Voss et al. ..................... 422/177 |
| 2004/0043897 A1 | * | 3/2004 | Tadao ........................... 502/302 |
| 2004/0048741 A1 | * | 3/2004 | Poulston et al. .............. 502/302 |
| 2004/0219077 A1 | * | 11/2004 | Voss et al. ..................... 422/177 |
| 2004/0258593 A1 | * | 12/2004 | Koo et al. ................... 423/239.1 |
| 2005/0042151 A1 | * | 2/2005 | Alward et al. ................ 422/177 |
| 2006/0019824 A1 | * | 1/2006 | Miyoshi et al. ............... 502/304 |
| 2006/0177367 A1 | * | 8/2006 | Li et al. ...................... 423/239.1 |

(Continued)

FOREIGN PATENT DOCUMENTS

DE   10 2005 027 063    12/2006
EP     0 315 896 A1      5/1989

(Continued)

OTHER PUBLICATIONS

Li, Shiyao "Catalytic Reduction of NOx by CO and Hydrocarbons over Different Catalysts in the Presence or Absence of O2." Dalian Institute of CHemical Physics, Chinese Academy of Sciences, 69 No. 1 (2000) 105-113.*

(Continued)

*Primary Examiner* — Melvin C Mayes
*Assistant Examiner* — Sheng H Davis
(74) *Attorney, Agent, or Firm* — Dickstein Shapiro LLP

(57) ABSTRACT

A method and apparatus for the removal of $NO_2$ emission from a lean burn compression ignition engine, wherein $NO_2$ containing engine exhaust gas is brought in contact with a catalyst being active in the reduction of $NO_2$ to NO and comprising at least one platinum group metal with the proviso that the platinum metal is not platinum and at least one redox active metal oxide and thereby reducing $NO_2$ contained in the exhaust gas to NO by reaction with CO, hydrocarbons and/or soot being present in the exhaust gas.

3 Claims, 3 Drawing Sheets

(56) References Cited

U.S. PATENT DOCUMENTS

2006/0272316 A1* 12/2006 Miyashita .................. 60/282
2007/0025901 A1* 2/2007 Nakatsuji et al. ......... 423/239.2
2007/0089403 A1* 4/2007 Pfeifer et al. ................ 60/286

FOREIGN PATENT DOCUMENTS

| EP | 0 870 531 A | | 10/1998 |
|---|---|---|---|
| EP | 1 338 322 A | | 8/2003 |
| EP | 1 493 484 A | | 1/2005 |
| JP | 60232253 | * | 11/1985 |
| JP | 01011643 | * | 1/1989 |
| JP | 2-14744 A | | 1/1990 |
| JP | 2002 204956 A | | 7/2002 |
| KR | 2003-0010968 A | | 2/2003 |
| KR | 2003-0091537 A | | 12/2003 |
| WO | 2004090296 | * | 10/2004 |
| WO | WO 2006/040533 | | 4/2006 |
| WO | WO2006040533 | * | 4/2006 |

OTHER PUBLICATIONS

Kolli, Tanja "Pd/Al2O3-Based Automotive Exhaust Gas Catalysts". Oulu University Press. 238 (2006).*

* cited by examiner

METHOD AND APPARATUS FOR THE PURIFICATION OF EXHAUST GAS FROM A COMPRESSION IGNITION ENGINE

FIELD OF THE INVENTION

The present invention relates to a method and apparatus for the purification of exhaust gas from a lean burn compression ignition engine such as a diesel engine and an apparatus for use in that method. In particular, the invention is directed to removal of nitrogen dioxide ($NO_2$) by reduction to nitrogen monoxide (NO) when reacting the dioxide with carbon monoxide (CO), hydrocarbons (HC) and/or soot being contained in the exhaust gas in presence of a catalyst. The apparatus being suitable for employment in the method comprises a particulate filter being coated with that catalyst.

The invention is in particular useful in connection with lean burn compression ignition engines.

BACKGROUND OF THE INVENTION

Conventional lean burn compression ignition engines such as diesel engines produce diesel particulate matter (PM) emissions including soot and volatile and soluble organic fractions. Future legislated limits for PM require the installation of a particulate filter in the exhaust system.

A known problem with soot filters is that they are plugged with soot during operation, which requires continuous or periodical regeneration to prevent excessive pressure drop over the filter. Periodical regeneration is conventionally performed by increasing the temperature in the exhaust system to a temperature, where the captured soot is oxidized to gaseous components and thus removed from the filter.

Typically, the required temperature increase is obtained by injecting extra fuel, which is burned over a diesel oxidation catalyst (DOC) placed in the exhaust system upstream the filter. A DOC is already installed in many diesel vehicles to meet the emissions limits for hydrocarbons and CO. Both the increased pressure drop over the filter and the periodical regeneration gives rise to a fuel penalty compared to an engine exhaust gas system without a particulate filter.

Different systems have been developed in order to lower this fuel penalty. One such system is disclosed in U.S. Pat. No. 4,902,487, which has been commercialized as the "Continuously Regenerating Trap". In this system $NO_2$ is used for combusting diesel particulate deposited on a filter at lower temperature than possible with oxygen also available in the gas. $NO_2$ is obtained by oxidising NO being present in the exhaust gas over a suitable catalyst placed upstream of the filter. This NO oxidation catalyst typically contains Pt, which is known as an excellent NO oxidation catalyst. To further increase the $NO_2$ content in the exhaust gas, filters have also been coated with a Pt containing catalyst. As a disadvantage of such systems, $NO_2$ can slip past the filter and be undesirably exhausted to atmosphere, when there is insufficient PM on the filter to react with $NO_2$ generated over the oxidation catalyst or the temperature of the exhaust gas is below a preferred range for combustion of PM in $NO_2$.

DE102005027063A1 discloses a device for after treatment of oxygen containing exhaust gases of internal combustion engine has nitrogen dioxide reduction catalytic converter which is provided as part at flow end of exhaust gas after treatment device being provided with an oxygenation catalyst and/or a soot filter. The SCR catalyst for the reduction of nitrogen dioxide contains is impregnated with small amounts of platinum metals.

WO06040533A1 relates to decomposition of nitrogen dioxide to nitrogen monoxide in lean-burn internal combustion engine by contacting acidic metal oxide with exhaust gas. The acidic metal oxide is selected from the group consisting of zeolites, tungsten-doped titania, silica-titania, zirconia-titania, gamma-alumina, amorphous silica-alumina and mixtures thereof.

$NO_2$ is toxic in low doses. It is apprehensive that the levels of $NO_2$ in European cities and highways increase [See presentations from "$NO_2$ Workshop, Munich February 2006"]. Legislative authorities have therefore begun to discuss limiting the amount of $NO_2$ to an acceptable level being permissible in the exhaust gas. For example the yearly average downtown Stuttgart was in 2004 68 $\mu g/m^3$, which by order shall be reduced to a limit of 40 $\mu g/m^3$ $NO_2$ (yearly average) in Stuttgart in 2010. Accordingly, it is presumed that reduction of both PM and $NO_2$ in exhaust gas emissions to the atmosphere will be required by law.

It is thus a general object of the present invention to provide a method and apparatus for the substantial reduction of $NO_2$ and preferably $NO_2$ and PM in the exhaust gas from a compression ignition engine.

SUMMARY OF THE INVENTIONS

Pursuant to the above general object, this invention provides a method for the removal of $NO_2$ emission from a lean burn compression ignition engine, wherein $NO_2$ containing engine exhaust gas is brought in contact with a catalyst being active in the reduction of $NO_2$ to NO and comprising at least one platinum group metal with the proviso that the platinum metal is not platinum and at least one redox active metal oxide, thereby reducing $NO_2$ contained in the exhaust gas to NO by reaction with CO, hydrocarbons and/or soot being present in the exhaust gas.

Preferred embodiments of the inventive method are disclosed in the detailed description of the invention.

The invention provides furthermore an apparatus for use in the above method. The apparatus comprises in its most general form an engine exhaust gas system being provided with a catalyst being effective in reaction of $NO_2$ with CO, HC and/or soot to NO, wherein the catalyst comprises at least one platinum group metal with the proviso that the platinum metal is not platinum and at least one redox active metal oxide.

Preferred embodiments of the apparatus according to the invention are disclosed in and apparent from the detailed description of the invention.

DETAILED DESCRIPTION OF THE INVENTION

According to a preferred embodiment of the invention the $NO_2$ reduction catalyst is coated on a diesel particulate filter. This filter may be any known type such as a ceramic wall-flow monolith filter, ceramic fibre filter or a sinter metal filter. The main components of the wallflow monclith filter are preferable silicon carbide, cordierite or alumina titanate.

The catalytic coat comprises preferably palladium in an amount of 0.2 to 5 g/L filter and more preferably 0.5 to 2 g/L filter.

The catalytic coat also contains at least one redox active oxide. Redox active meaning the metal is capable of existing in different oxidation states. The preferred amount of redox active oxide is 1 to 100 g/L filter and more preferably 5 to 60 g/L filter.

Preferred oxides are $MnO_2$, $Fe_2O_3$, $SnO_2$, $PrO_2$, and $CeO_2$. The most preferable redox active oxide is $CeO_2$.

Optionally the catalytic coat and the redox active metal oxides are stabilized with one or more oxides selected from the group consisting of $TiO_2$, $WO_3$, $SiO_2$, $HfO_2$, $ZrO_2$, $MgO$, $CaO$, $Al_2O_3$, $La_2O_3$ and $BaO$.

When the oxide is $CeO_2$, the most preferred stabilising oxide is $ZrO_2$.

The components of the catalytic coat can be applied to the filter with any method known in the art. These methods include the sequence of washcoating, impregnation, drying, calcination and reduction. The catalyst can be arranged inside the filter wall and/or outside of the filter wall.

Figure 1:
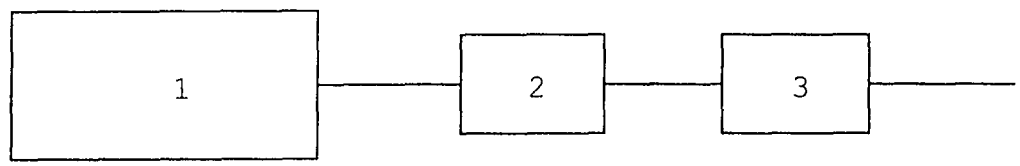
FIG. 1 shows the filter of the present invention placed in the exhaust system of a lean burn compression ignition engine, with a diesel oxidation catalyst between the engine and the filter.

In one embodiment of the invention this filter is placed in the exhaust system of a lean burn compression ignition engine, e.g. a diesel engine, as shown in FIG. 1, where (1) is a lean burn compression ignition engine, optionally including a system for injection of extra fuel to raise the exhaust temperature for regeneration of the particulate filter by burning soot and optionally including a system for injecting fuel borne catalyst for lowering the soot burning temperature in the particulate filter;

(2) is a Diesel Oxidation Catalyst (DOC) supported on a flow through monolith capable of oxidising hydrocarbons and CO for lowering the emission of these components and for increasing the exhaust temperature if extra fuel is injected to regenerate the particulate filter. The DOC can optionally also oxidise NO to $NO_2$ in order to continuously oxidise soot at lower temperature via $NO_2$;

(3) is a particulate filter coated according to the present invention, which results in a reduction of the amount of $NO_2$ and PM emission. $NO_2$ is reduced to NO by reaction with CO, hydrocarbons and/or soot. The catalytic coat also reduces the temperature required to regenerate particulate filter.

Figure 2:
FIG. 2 shows the filter of the present invention placed in the exhaust system of a lean burn compression ignition engine, without a diesel oxidation catalyst between the engine and the filter.

In another embodiment of the invention this filter 3 is placed in the exhaust system of a lean burn compression ignition engine, e.g. a diesel engine as shown in FIG. 2. (1) is a lean burn compression ignition engine optionally including a system for injection of extra fuel to raise the exhaust temperature for regeneration of the particulate filter by burning soot and optionally including a system for injecting fuel borne catalyst for lowering the soot burning temperature in the particulate filter. (3) is the particulate filter coated according to the present invention, which results in a reduction of both $NO_2$ and PM emissions. $NO_2$ is mostly reduced to NO by reaction with reductants present in the exhaust gas. These reductants can be CO, hydrocarbons and soot. The catalytic coat also reduces the temperature required to regenerate particulate filter. Furthermore, the catalysed filter is capable of reducing the CO and hydrocarbon emissions.

EXAMPLES

Example 1

A 3.3 L commercially available SiC wall flow diesel particulate filter is via conventional impregnation, drying and calcination steps coated with $CeO_2$, $ZrO_2$ and PdO inside the filter wall. The Ce content is 45 g/L filter, the Zr content 9.4 g/L filter and the Pd content is 1.5 g/L filter.

The filter is tested in the exhaust system of an engine bench equipped with a 1.4 L HDI engine from a Citroen C2-2004 model. The setup corresponds to FIG. 1. During the test the CO, hydrocarbon, NO and $NO_x$ levels in the exhaust gas after passing the filter are monitored. The engine is run at 2500 rpm and the load is varied to determine the catalyst activity at different filter temperatures.

Figure 3:
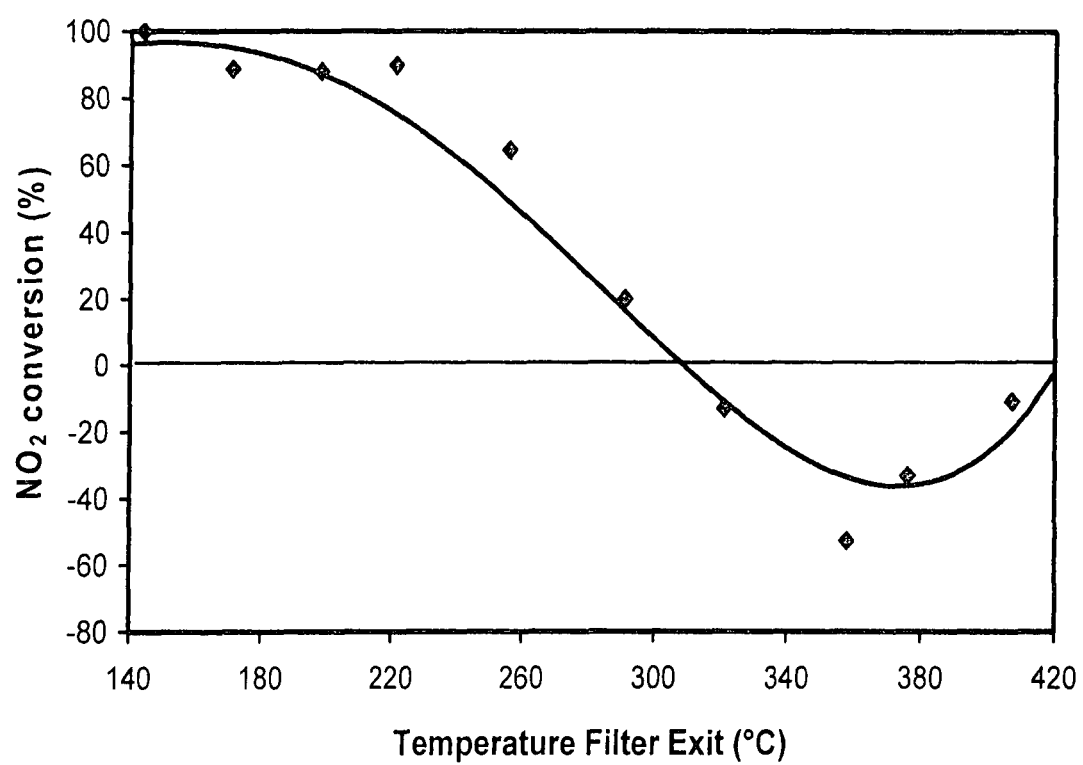
FIG. 3 is a graph showing measured concentrations of $NO_2$ plotted as a function of the filter temperature.

Measured concentrations of NO and $NO_2$ are summarized in Table 1 and in FIG. 3, where the $NO_2$ conversion obtained from comparison with measurements on an uncoated filter is plotted as a function of the filter temperature. The $NO_2$ concentration in the gas is determined by subtracting the NO concentration from the $NO_x$ concentration. It is observed that all $NO_2$ is converted to mainly NO, when the filter temperature is below 300° C. and forms extra $NO_2$ when the filter temperature is above 300° C. During a standard driving cycle this leads to net removal of $NO_2$ since the exhaust temperature is mainly below 300° C. This is described in Example 2.

The capability of the filter to burn soot is quantified with the balance point temperature, which is the filter temperature, where the pressure drop over the filter is constant since the amount of soot caught by the filter equals the soot that is removed by oxidation. The balance point temperature is 400° C. For an uncoated filter this temperature is above 450° C. in the same engine bench test protocol.

The CO and hydrocarbon conversion rates are determined in the same way. The temperatures for 50% conversion of both exhaust components are lower than 200° C.

Table 1: NO and $NO_x$ concentration measured in the engine bench described in Example 1 for an uncoated SiC wall flow particulate filter and the filter described in Example 1.

TABLE 1

| Engine power (kW) | Exit uncoated filter | | Exit coated filter of Example 1 | | | |
|---|---|---|---|---|---|---|
| | $NO_x$ (ppm) | NO (ppm) | T Filter (° C.) | $NO_x$ (ppm) | NO (ppm) | $NO_2$ conversion (%) |
| 2 | 79 | 38 | 144 | 84 | 84 | 100 |
| 4 | 99 | 55 | 171 | 104 | 99 | 89 |
| 6 | 128 | 78 | 198 | 128 | 122 | 88 |
| 8 | 161 | 112 | 221 | 153 | 148 | 90 |
| 12 | 276 | 228 | 256 | 264 | 247 | 65 |
| 16 | 411 | 361 | 291 | 391 | 351 | 20 |
| 20 | 581 | 519 | 321 | 565 | 495 | −13 |
| 24 | 733 | 661 | 358 | 700 | 590 | −53 |
| 28 | 1017 | 875 | 376 | 1050 | 861 | −33 |
| 32 | 1473 | 1242 | 407 | 1353 | 1097 | −11 |

Example 2

A 3.3 L SiC wall flow filter coated with catalyst as described in Example 1 is used to replace an uncoated filter in a Citroen Xsara Picasso 1.6 L HDI—model year 2006. The filter is placed downstream of a Pt containing DOC catalyst. Fuel born catalyst is added to the diesel to lower the soot oxidation temperature. The setup corresponds to the one sketched in FIG. 2.

Before and after replacing the filter the vehicle is tested in the NEDC standardised driving cycle, while emissions are monitored. The accumulated results are shown in Table 2.

Table 2: Emissions measured in NEDC test on Citroen Xsara Picasso equipped with a 1.6 L HDI engine and with a Pt containing DOC upstream the filter. An uncoated particulate filter is compared to a catalyst coated filter as described in Example 1.

TABLE 2

| NEDC test | HC (g/km) | NO (g/km) | $NO_x$ (g/km) | $NO_2$ ($NOx-NO$) (g/km) | $CO_2$ (g/km) | CO (g/km) | PM (g/km) |
|---|---|---|---|---|---|---|---|
| Pt/DOC + Uncoated filter | 0.04 | 0.114 | 0.202 | 0.088 | 115 | 0.027 | 0.0028 |
| Pt/DOC + Filter coated with catalyst of Example 1 | 0.00 | 0.159 | 0.183 | 0.024 | 116 | 0.024 | 0.0044 |

The invention claimed is:

1. A method for the removal of NO2 emission from a lean burn compression ignition diesel engine and regenerating a diesel particulate filter, the method comprising the steps of:
providing a diesel particulate filter; providing a catalyst supported on or inside the walls of the diesel particulate filter, the catalyst being active in the reduction of NO2 to NO and consisting of palladium oxide and CeO2 stabilized with ZrO2;
bringing NO2 containing diesel engine exhaust gas in contact with the catalyst in the diesel particulate filter and reducing the NO2 contained in the diesel exhaust gas to NO by reaction with soot present in the diesel exhaust gas; and
catalyzing the oxidization of soot by reduction of NO2 to NO and reducing the amount of soot in the diesel particulate filter, thereby regenerating the diesel particulate filter.

2. The method of claim 1, wherein an oxidation catalyst is provided upstream of the diesel particulate filter.

3. An apparatus for use in the method of claim 1, comprising a diesel engine exhaust gas system provided with a catalyst effective in reaction of NO2 with soot to NO, wherein the catalyst consists of palladium oxide and CeO2 stabilized with ZrO2, and wherein the catalyst is supported on or inside the walls of a diesel particulate filter.

* * * * *